(12) United States Patent
Spiegler

(10) Patent No.: US 6,860,522 B1
(45) Date of Patent: Mar. 1, 2005

(54) CONNECTOR FITTING FOR A HIGH PRESSURE HOSE

(76) Inventor: Lothar Spiegler, Kunzenweg 16, Freiburg D-79117 (DE)

(*) Notice: Subject to any disclaimer, the term of this patent is extended or adjusted under 35 U.S.C. 154(b) by 0 days.

(21) Appl. No.: 10/130,912
(22) PCT Filed: Nov. 21, 2000
(86) PCT No.: PCT/EP00/11538
§ 371 (c)(1), (2), (4) Date: Jul. 23, 2002
(87) PCT Pub. No.: WO01/38773
PCT Pub. Date: May 31, 2001

(30) Foreign Application Priority Data

Nov. 23, 1999 (DE) .......................................... 29920550

(51) Int. Cl.[7] .............................................. F16L 33/00
(52) U.S. Cl. ...................................... 285/256; 285/239
(58) Field of Search .................................. 285/239, 256

(56) References Cited

U.S. PATENT DOCUMENTS

| | | | |
|---|---|---|---|
| 651,134 A | * 6/1900 | Dickens | 285/239 |
| 1,725,286 A | 8/1929 | Loughead | |
| 1,778,244 A | * 10/1930 | Cadden | 285/256 |
| 2,481,001 A | * 9/1949 | Burckle | 285/256 |
| 3,791,406 A | * 2/1974 | Philipps | 285/239 |
| 4,226,446 A | 10/1980 | Burrington | |
| 4,330,142 A | * 5/1982 | Paini | 285/256 |
| 5,199,751 A | * 4/1993 | Beagle et al. | 285/256 |
| 5,794,983 A | * 8/1998 | Melvin | 285/256 |
| 5,918,913 A | * 7/1999 | Lewis et al. | 285/239 |
| 6,447,017 B1 | * 9/2002 | Gilbreath et al. | 285/256 |

FOREIGN PATENT DOCUMENTS

| | | | | |
|---|---|---|---|---|
| DE | 4102047 C2 | 5/1993 | | |
| DE | 29713189 U1 | 10/1997 | | |
| EP | 0258524 A2 | 3/1988 | | |
| EP | 589413 | * 9/1993 | | 285/256 |
| FR | 1003337 | 3/1952 | | |
| GB | 1325967 | 8/1973 | | |
| WO | 9413994 | * 6/1994 | | 285/256 |

OTHER PUBLICATIONS

Prospectus for HASCO®, Hose Coupling System, Sheet 5.1., 1992.
"Global System" prospectus of Allegri Cesare Spa, Sesto S. Giovanni (Italy).

* cited by examiner

Primary Examiner—David Bochna
(74) Attorney, Agent, or Firm—Volpe and Koenig, P.C.

(57) ABSTRACT

The invention relates to a connector fitting (3), for a high pressure hose (1), which comprises at least two components and has a connector unit (4), for connecting to a high pressure hose (2). The connector unit (4) may be connected to one of several different designs of coupling unit (5), which are destined for the connector unit (4). The connector unit (4) has a shaped nipple on the end away from the coupling unit (5), which fits in the facing open end of the high pressure tube (2). The high pressure tube (2) is thus sealed tight in a ring gap, defined by the outer surface of the nipple (7) and the inner surface of a clamping ring (9) which may be pressed onto the connector unit. According to the invention, the connector fitting (3) is characterized in that the connector unit (4) and the high pressure tube (2), sealed in the ring gap, may be rotated relative to each other.

17 Claims, 2 Drawing Sheets

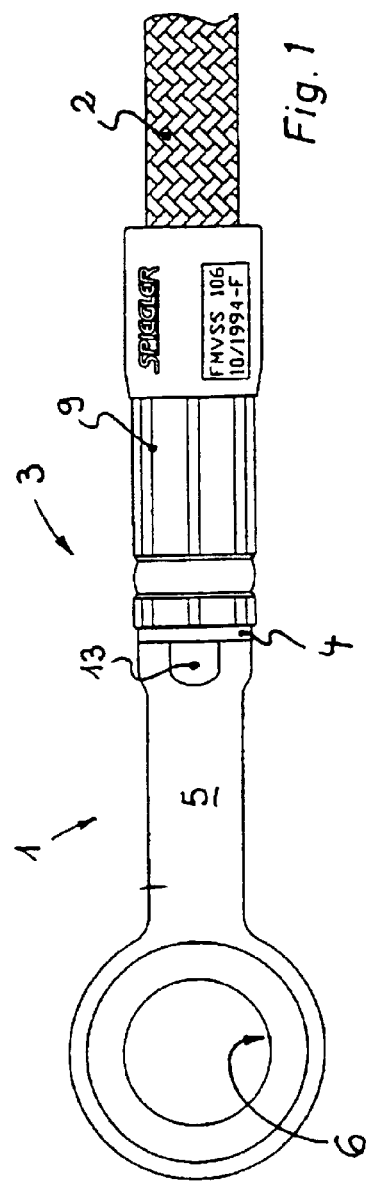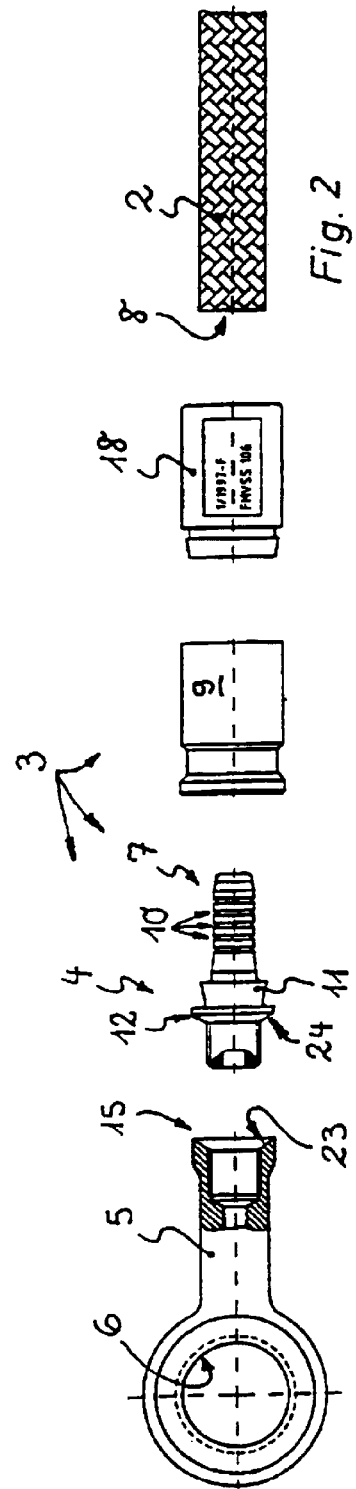

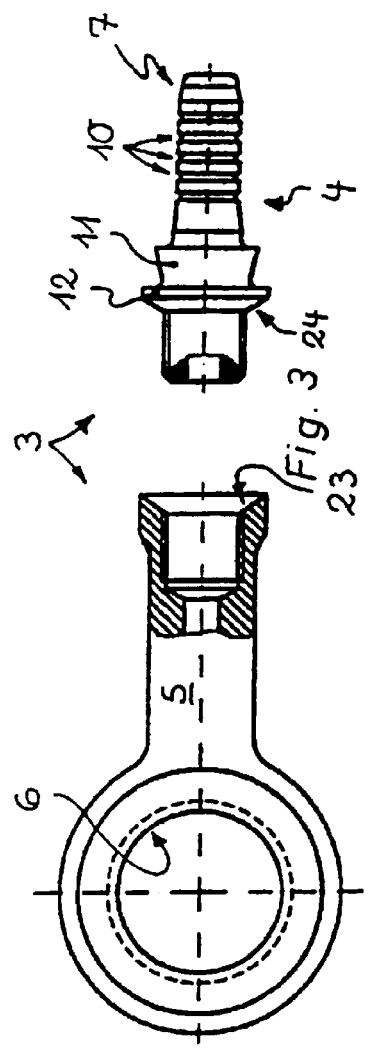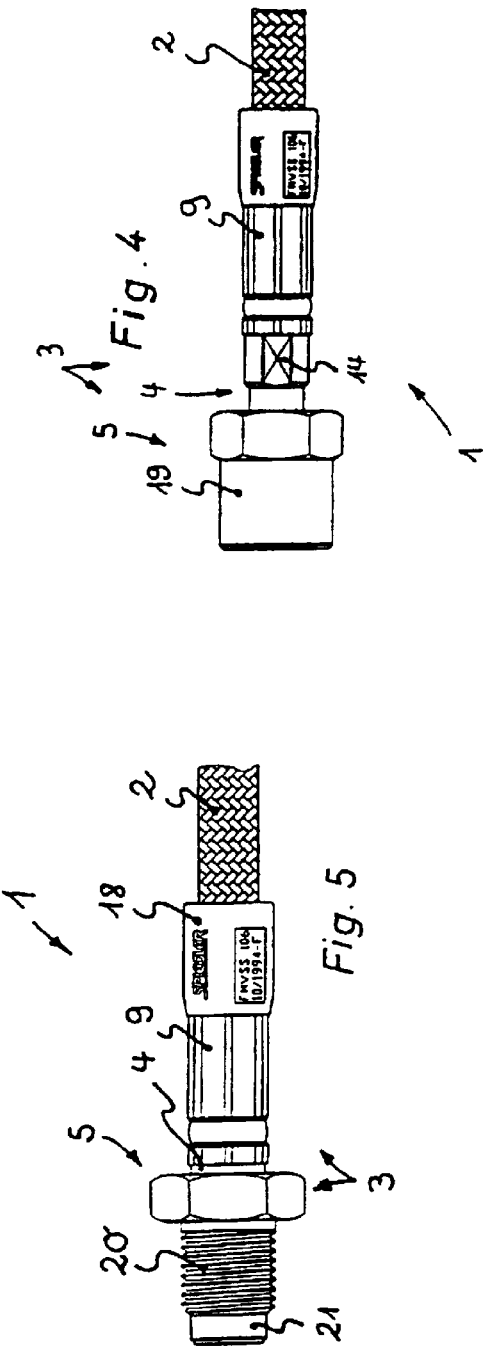

CONNECTOR FITTING FOR A HIGH PRESSURE HOSE

This invention pertains to a connector fitting for a high pressure hose, that has an end with a profiled nipple that is engaged in an end of a tube opening of the high pressure hose. The high pressure tube is held leak-tight in an annular gap between the exterior of the nipple and the interior of a clamping sleeve that is pressed onto the connecting element, and the connecting element and the high pressure tube that is held leak tight in the annular gap are rotatable relative to one another.

Connector fittings for high pressure hoses are generally known. From GB-A-2 035 498 and GB-A-1 325 967, connecting elements are known that have one end with a profiled nipple for pushing on to or drawing over a tube end, and which on the other end are removably connectable to a further line section of the high pressure hose line.

From DE 41 02 047 C2 submitted by this applicant, a connector fitting is already known having a one-piece coupling element, one end of which is designed as a connecting eyelet and the other end of which is designed as a profiled nipple on which to pull or push one end of a tube. The end of the tube can be held on the nipple using a clamping sleeve that compresses the end of the tube in the annular gap formed between the interior wall of the clamping sleeve and the nipple and fixes it in the axial direction. The end of the tube can rotate within this annular gap and still be held there leak-tight. In order to now prevent ongoing damage at this point in the hose when the coupling element is rotated with respect to the end of the tube connected to it, the sides of the clamping sleeve and the nipple that form the annular gap are designed with no cutting edges. In addition, it is provided that the profiles located on these sides include at least one right angle at their corners or transition areas.

Indeed, this prior art connector fitting itself allows the end of the hose to rotate on the nipple of the coupling element, but a number of such hoses with different lengths and with a wide variety of coupling end pieces have to be on hand at the shops involved with the assembly of these kinds of hoses so as to come up with the right coupling ends for the necessary hoses on short notice as needed. However, this requires a high investment on the part of the shops and a large amount of storage space.

A modular brake line system has already been proposed in the "Global System" prospectus of Allegri Cesare Spa, Sesto S. Giovanni (Italy), which includes connector fittings of the type mentioned above, among other things. Each of these prior art connector fittings is designed with at least two parts and has a connecting element that has threads that can be connected to mating threads in one of many different coupling element designs that can be used with the connecting element. Whereas the connecting element is connected to a high pressure tube, the coupling element is provided with a matching coupling element to removably connect it to a high pressure hose. The connecting element has a profiled nipple at its end opposite the coupling element, said nipple fitting into the open end of a high pressure tube, wherein this high pressure tube is held there leak-tight in an annular gap between the exterior of the nipple and the interior of a clamping sleeve that is pressed onto the connecting element.

The connecting element of the prior art connector fitting is designed with multiple parts and has a union nut with internal threads that can be screwed onto the external threads of the coupling element. The coupling element has a connection stub that, when the coupling element and the connecting element are screwed together, fits into the adjacent open end of the tube held in the connecting element. In order to obtain the required seal between the connecting element and the coupling element, an O-ring is required inside the union nut that sits against the exterior circumference of the connection stub in a leak-tight manner.

The prior art brake line system makes it possible to stock a small number of different lengths of high pressure hoses that have a single connecting element at their ends. In this way, an existing high pressure hose in the required length can be completed by screwing on the required coupling element to the end of the hose according to the actual installation. The coupling elements available for the connecting elements have straight or angled coupling ends or are designed as circular eyelet, or are provided with a union nut, with the coupling ends being tailored to connect to a complementary matched coupling on the brake line located in a car or motorcycle, for example.

Although the coupling ends of a high pressure hose in this prior art brake line system can indeed be easily tailored to the actual installation, the conditions of the installation may, however, also require a specific rotational position of the coupling element located at one end of the line relative to the high pressure tube and the connecting element connected to it at the other end. However, it is only possible to position the coupling element and the high pressure hose in the prior art connector fitting at the union nut provided between the coupling element and the connecting element. Since the connection between the union nut and the coupling element is loose, relatively speaking, it takes a lot of work to get a good seal in the brake line at this point. Moreover, there is the danger that the union nut can come loose again if it and the coupling element have to be positioned relative to one another.

Therefore, it is the specific object of this invention to create a connector fitting of the type mentioned above that can be manufactured with little effort and that can be easily tailored to the actual installation—but still guarantee a leak-tight and sturdy connection of the individual fitting elements at the connector fitting under high pressures.

The solution to this object according to the invention for connector fittings of the type mentioned above includes, in particular, that the connecting element is provided in at least two pieces and includes a connecting element that has a nipple on one end and threads on the other end, and the threads are engageable with mating threads from a coupling element selected from a plurality of different coupling elements that are removably connectable to a mating coupling for the high pressure hose.

The connector fitting according to the invention has a connecting element that is held leak-tight on the high pressure tube, and a number of different coupling element designs can be attached to this connecting element. The required coupling element can be selected as needed and be securely screwed onto the connecting element, tailoring it according to the existing installation. The user responsible for assembling these kinds of high pressure hose lines thus only needs to keep on hand approximately 10% of the usual number of high pressure tubes in the most common lengths and a set of associated coupling elements in order to be able to select the required individual parts as needed and assemble them on an individual basis to the selected hose. This allows the coupling element of the connector fitting according to the invention can be rotated with respect to the high pressure tube without the screwed connection between the coupling element and the connecting element coming loose on its own, and there being the fear of a possible loss of seal in the hose.

It is much easier to work with the connector fitting according to the invention when assembling the coupling element and the connecting element if the threads and their mating threads are screwed together up to a stopping point, and if the back end of the connecting element or coupling element that contains the internal threads cooperates with a preferably circular shoulder on the other fitting element that serves as the stopping point, at least in areas.

It is of course also possible to connect the connector element of the connector fitting according to the invention and the associated coupling elements using a union nut, but a preferred embodiment of the invention provides that the back end that contains the internal threads and the circular shoulder that acts as a stopping point, at least in areas, come into sealed contact with one another.

The coupling element and connecting element can be sealed at their ends facing one another using an O-ring and/or a hydraulic sealant. However, an especially simple and advantageous embodiment of the invention provides that the circular shoulder and the back end that contains the internal threads have flat surfaces that come into sealed contact with one another.

It is especially advantageous if at least one of these components, the coupling element and/or the connecting element, has a sealing cone at its back end that sits against the inside surface of the other fitting part, which is shaped at this point to complement the sealing cone, when these fitting elements are screwed together.

A further preferred embodiment of the invention having additional protectable features of its own provides that the circular shoulder and the back end that contains the internal threads have conical surfaces facing one another or are designed as conical surfaces, that these conical surfaces have different conical angles such that only the outer annular regions of the conical surfaces come in sealed contact, and that a residual gap is provided between the circular shoulder and the back end into which to insert a sealant. In this further-developed embodiment, the conical surface provided at the coupling element, for example, has a steeper conical angle compared to the conical complementary surface at the connecting element such that only the outer annular regions of the conical surfaces come into sealed contact. If, for example a fluid or paste-like sealant is applied to the area of the circular shoulder, this sealant is pushed inward when the two fitting elements are screwed together, in other words it is pushed into the remaining gap between the circular shoulder and the back end and not outward. Since in this way a sufficient amount of sealant always remains in this area, a sealed-tight and permanent connection between the connecting element and the selected coupling element is ensured.

The sealed contact where the connecting element and coupling element are connected is improved if one of the fitting elements is made of high-grade steel and the other fitting element is made of a softer material, preferably aluminum. It is, however, also possible to make the coupling element and the connecting element from the same material, preferably stainless steel.

It is also possible for the coupling elements to contain external threads that can be screwed into internal threads in the connecting element.

In order to provide the connector fitting with as short a dimension as possible and to provide a relatively small external diameter along almost all of its length, an embodiment is preferred in which the connecting element contains external threads that can be screwed into internal threads in the coupling elements. In this embodiment, the circular shoulder must be provided at the connecting element, whereas each of the coupling ends contains a back end that contains the internal threads. In this embodiment, the connecting element can be kept relatively short and its weight correspondingly low, whereas at the same time a larger portion of the hydraulic line can be made to be flexible.

In order to be able to rotate the high pressure hose safely and easily with respect to the connector fitting and its connecting element, it is advantageous for the clamping sleeve to ride on a rotation guide on the connecting element that allows it to rotate but not shift in the axial direction. Also, the rotation guide can be designed as a conical collar, annular flange or a similar guide shoulder.

In order to ensure that the clamping sleeve is especially sturdy, it is advantageous if the clamping sleeve is made of, preferably, stainless steel.

When the high pressure tube is rotated with respect to the connector fitting, cuts in the tube and similar damages are safely avoided by designing the outside of the nipple and the inside of the clamping sleeve, which form the annular gap, with no sharp cutting edges. In addition, a preferred embodiment of the invention provides that the profiling provided on the sides of the clamping sleeve and the nipple that form the annular gap include at least one right angle at their corners and transition areas.

It is even easier to work with the connector fitting according to the invention if at least one tool gripping surface is provided on the coupling element and/or on the connecting element for a rotating tool.

In order to prevent the individual components of the connector fitting according to the invention from going out of alignment when turning or screwing them, it is advantageous if the tool gripping surface on the coupling element and/or connecting element is provided near the external line of separation between these fitting parts.

Thus, for example, two wrench surfaces that are approximately parallel with one another and at opposite sides on the surface of the connecting element and/or coupling element can act as gripping points for an open-ended wrench. It is also possible, however, to attach a hex connection to these components or to provide a radial hole into which a pin of a rotating tool can be inserted.

It is also possible that the connecting element has a gripping surface for a tool near the line of separation between the connecting element and the clamping sleeve.

In order to improve the compact design of the connector fitting according to the invention, it is advantageous if the clamping sleeve of the connecting element has a tool gripping surface for a rotation-prevention tool. A preferred embodiment of the invention provides that the tool gripping surface is designed into the clamping sleeve as an impression, in particular as at least one notch, ridge, groove or the like running perpendicular to the circumference of the sleeve.

One embodiment of the invention provides that at least one coupling element has a connection opening, preferably designed as a circular eyelet, through which to insert a matching coupling element.

Another embodiment of the invention provides that at least one coupling element is designed in at least two parts and has a union nut, a connecting screw or the like to connect to a matched coupling, with the union nut or the like attaching to an enlarged coupling end of the coupling element.

BRIEF DESCRIPTION OF THE DRAWINGS

Other features of the invention can be found in the following description of a preferred embodiment according to the invention in connection with the claims and the drawing. The features can be implemented individually in and of themselves or in combination as an embodiment of the invention.

Shown are:

FIG. 1 a high pressure hose connector fitting, wherein the connector fitting is designed in more than one part and has a connecting element connected to a high pressure tube and a coupling element at its end, FIG. 2 the high pressure hose line in FIG. 1 in an exploded representation of its individual components, FIG. 3 the connecting element and the coupling element of a connector fitting comparable to FIGS. 1 and 2, wherein the coupling element of this connector fitting also has a connecting eyelet, and FIGS. 4 and 5 other high pressure hose lines in which the connecting element of the connector fitting is connected to different designs of coupling elements.

DETAILED DESCRIPTION OF THE PREFERRED EMBODIMENTS

In FIGS. 1 and 2, a high pressure hose 1 is shown that has a braided-metal high pressure tube 2. This high pressure tube 2 is connected to a connector fitting 3, that here has a two piece coupling element, that is made from a connecting element 4 on the tube side and a coupling element 5 on the line side.

As can be clearly seen in the exploded representation in FIG. 2, the connecting element 4 has external threads that can be screwed into internal threads in the coupling element 5. Whereas the coupling element 5 is provided for the purposes of connecting to a matched coupling on the high pressure hose (not shown here) and to be removable, and to this end has a connection opening 6 in the form of a circular eyelet, the connecting element 4 has a profiled nipple 7 at its end opposite the coupling element 5. This profiled nipple is pushed into the open end 8 of the high pressure tube 2. In order to securely connect the high pressure tube 2 to the connecting element 4, it is held tightly inside an annular gap between the external surface of the nipple 7 and the internal surface of a clamping sleeve 9 pressed onto the connecting element 4.

By comparing FIGS. 1, 4 and 5, it is clear that a number of different kinds of coupling elements 5 can be used with the connecting element 4 and that any of these coupling elements 5 can be selected to connect to the connecting element 4 depending on the installation. However, since the conditions of the installation frequently require not only the selection of one of these coupling elements but also require a particular rotational position between the coupling element 5 and the high pressure tube 2 so as to counteract any undesired twisting in the high pressure hose 1, the connecting element 4 and the high pressure tube 2 held tightly in the annular gap are made to rotate relative to one another.

In order to prevent the profiling 10 from cutting into the tube material when the connector fitting 3 is rotated relative to the high pressure tube 2, and to counteract the damage to the high pressure tube 2, the outside of the nipple 7 and the inside of the clamping sleeve 9 forming the annular gap are designed with no cutting edges.

As can be seen in FIGS. 2 and 3, the profiling 10 provided on the sides of the clamping sleeve 9 and the nipple 7 that form the annular gap also include at least one right angle at their corners and transition areas.

As can be seen in FIGS. 2 and 3, the clamping sleeve 9 is held at a rotation guide on the connecting element 4 and allowed to rotate there but not shift in the axial direction. This rotation guide is designed here as a conical collar 11 that narrows in the direction toward the open end of the line, with the conical collar acting as a guide shoulder. By compressing the clamping sleeve 9, which is not yet compressed in FIG. 2, it form-locks with the guide shoulder 11; in the process, axial protrusions on the pressing tool form grooves in the outside of the clamping sleeve that subsequently serve as support grooves or similar tool gripping surfaces for a rotation-prevention tool.

As can be seen in FIGS. 1, 4, and 5, the connecting element 4 has an area with an extended cross section 12 against which the clamping sleeve 9 sits. Whereas this extended cross section is designed in the connector fittings of FIGS. 1 to 3 and 5 as a relatively short circular shoulder 12, the extended cross section of the connector fitting shown in FIG. 4, which is comparatively longer, is provided with a gripping surface 14 for a tool that is located near the outer line of separation of the clamping sleeve 9 and connecting element 4. This tool gripping surface 14 is made up of two flat surfaces that are provided on opposite sides on the outside of the extended cross section 12.

In contrast, the connector fittings 3 shown in FIGS. 1 through 3 have a tool gripping surface 13 on the coupling element 5, here as well located near the outer line of separation between the connecting element 4 and the coupling element 5. The tool gripping surface 13 provided on the coupling element 5 makes it easier to securely screw the connecting element 4 to the coupling element 5. If the coupling element 5 has a connection opening 6, a rotating tool can be used in addition to or instead of this, a plug-shaped section of said rotating tool being inserted into the connection opening 6 to screw the coupling element 5 and the connecting element 4 together.

It can be seen from FIGS. 2 and 3 that the external threads provided on a threaded plug of the connecting element 4 can be screwed into the internal threads of the coupling element 5 up to a stopping point. This stopping point is formed by the circular shoulder 12 of the connecting element 4 that is comes into sealed contact with the back end 15 of the coupling element 5 that contains the internal threads.

The circular shoulder 12 and the back end 15 that contains the internal threads have conical surfaces 23, 24 that face one another and have different conical angles such that only the outer annular regions of the conical surfaces 23, 24 come into sealed contact when these fitting elements 4, 5 are screwed together using common torques. The conical surface 23 provided on coupling element 5 has a steeper conical angle than the conical surface 24 of connecting element 4 opposite to it. The remaining gap between the circular shoulder 12 and the back end 15 is provided for the purposes of inserting a sealant (not shown here). Such a sealant, in particular a paste-like sealant, is applied prior to screwing the two fitting elements 4, 5 together, preferably applied to the circular shoulder 12, where free flow through the flow channel inside the connector fitting 3 is unimpeded. Since instead of being pushed outward, the sealant is constantly pushed inward into the gap remaining between the circular shoulder 12 and the back end 15, a leak-tight and permanent connection between the connecting element 4 and the selected coupling element 5 is ensured. After the fitting elements 4, 5 are screwed together, the threads between elements 4 and 5 are kept from rotating by grasping the connecting element 4 by its clamping sleeve 9, this clamping sleeve being able to rotate about the rotation cone 11 as needed.

Whereas the coupling element 5 is made of aluminum, the connecting element 4—as well as the clamping sleeve 9—is preferred to be made of stainless steel. An additional plastic sleeve 18 is held at the clamping sleeve 9 on the hose side to keep the high pressure hose 2 from kinking.

Whereas the coupling elements 5 of the connector fittings 3 shown in FIGS. 1 through 3 have a connector opening 6, the coupling elements 5 of the connector fittings 3 shown in FIGS. 4 and 5 are designed with at least two parts. The coupling element 5 of the connector fitting 3 in FIG. 4 has a union nut 19 to connect to a matching coupling element, with the union nut attaching to the back of an enlarged coupling end of the coupling element 5—not visible in FIG. 4.

In contrast, the coupling element 5 of the connector fitting 3 shown in FIG. 5 has a threaded connector 20 to connect to the matching coupling element, with the threaded connector attaching to the back of the enlarged coupling end 21 of the coupling element 5.

The inner cavity of the high pressure tube 2 that forms the flow channel continues through the connecting element 4 and the coupling element 5 in approximately coaxial flow channels. The exit opening at the coupling end 21 can have a hexagonal interior into which a hex-head wrench can be inserted to screw the coupling end 21 onto the connecting element 4.

A number of different designs of coupling elements 5 can be used on the connecting elements 4 of the connector fittings 3 shown here. As needed, the necessary coupling element 5 can be selected and be securely screwed to the connecting element 4 in order to apply the correct connector fitting 3 to the existing installation. Therefore, users tasked with installing high pressure hose lines 1 of this type only have to stock a few high pressure hoses in the necessary lengths and a set of the associated coupling elements 5 so as to be able to select the required individual parts as needed and to complete the hose line needed in the individual case. The coupling element 5 can rotate with respect to the high pressure tube 2 without the screw connection between the coupling element 5 and the connecting element 4 coming loose on its own, and without having to fear a possible loss of seal in the hose.

What is claimed is:

1. A connector fitting (3) for a high pressure hose (1), with a connecting element that has a profiled nipple (7) on one end, that is inserted in an end of a high pressure tube (2), whereby the high pressure tube (2) is sealed in an annular gap located between an outside of the nipple (7) and an inside of a clamping sleeve (9) that is pressed onto the connecting element (4), the connecting element (4) and the high pressure hose (2) are held tightly sealed in the annular gap and are rotatable with respect to one another, wherein the connecting element is formed of at least two pieces and includes a connecting element part (4) that has the nipple on one end and threads on another end thereof, and the threads are engageable with mating threads from a coupling element selected from a plurality of different coupling elements that are removably connectable to a mating coupling for the high pressure hose, the threads and their mating threads are screwed together up to a stopping point, and a back end (15) of the connecting element or the coupling element (4,5) that contains internal threads cooperates with a circular shoulder (12) on the other fitting element (5,4) that serves as the stopping point, at least in areas, the circular shoulder (12) and the back end (15) containing the internal threads have flat surfaces that come into sealed contact with one another, and the circular shoulder (12) and the back end (15) containing the internal threads include conical surfaces (23, 24) facing one another or are designed as conical surfaces, that have different conical angles such that only outer annular regions of the conical surfaces (23, 24) come in sealed contact, and a residual gap is provided between the circular shoulder (12) and the back end (15) into which to insert a sealant.

2. A connector fitting according to claim 1, wherein a back end (15) containing the internal threads and the circular shoulder (12) that acts as a stopping point, at least in areas, come into sealed contact with one another.

3. A connector fitting according to claim 1, wherein one of the fitting elements (4, 5) is made of high-grade steel and the other fitting element (5,4) is made of a softer material.

4. A connector fitting according to claim 1, wherein the coupling element (5) contain external threads that can be screwed into internal threads in the connecting element (4).

5. A connector fitting according to claim 1, wherein the connecting element (4) contains external threads that can be screwed into internal threads in the coupling elements (5).

6. A connector fitting according to claim 1, wherein the clamping sleeve (9) rides on a rotation guide on the connecting element (4) that allows it to rotate but not shift in an axial direction.

7. A connector fitting according to claim 6, wherein the rotation guide is formed as a conical collar (11), annular flange or a guide shoulder.

8. A connector fitting according to claim 1, wherein the clamping sleeve (9) is made of stainless steel.

9. A connector fitting according to claim 1, wherein an outside of the nipple (7) and an inside of the clamping sleeve (9), which form the annular gap, are formed with no cutting edges.

10. A connector fitting according to claim 1, wherein profiling (10) provided on sides of the clamping sleeve (9) and the nipple (7) that form the annular gap includes at least one right angle at corners and transition areas thereof.

11. A connector fitting according to claim 1, wherein at least one tool gripping surface (13, 14) is provided on at least one of the coupling element (5) and the connecting element (4) for a rotating tool.

12. A connector fitting according to claim 11, wherein the tool gripping surface (13, 14) on at least one of the coupling element (5) and the connecting element (4) is provided near an external line of separation between these fitting parts (4, 5).

13. A connector fitting according to claim 1, wherein the connecting element (4) has a tool gripping surface (14) near a line of separation between the connecting element (4) and the clamping sleeve (5).

14. A connector fitting according to claim 1, wherein the clamping sleeve (9) of the connecting element (4) has a tool gripping surface for a rotation-prevention tool.

15. A connecting fitting according to claim 14, wherein the tool gripping surface is designed into the clamping sleeve as an impression, comprising at least one notch, ridge, or groove running perpendicular to a circumference of the sleeve.

16. A connector fitting according to claim 1, wherein at least one coupling element (5) has a connection opening (6), formed as a circular eyelet, through which to insert a matching coupling element.

17. A connector fitting (3) for a high pressure hose (1), with a connecting element that has a profiled nipple (7) on one end, that is inserted in an end of a high pressure tube (2), whereby the high pressure tube (2) is sealed in an annular gap located between an outside of the nipple (7) and an inside of a clamping sleeve (9) that is pressed onto the connecting element (4), the connecting element (4) and the high pressure hose (2) are held tightly sealed in the annular gap and are rotatable with respect to one another, wherein the connecting element is formed of at least two pieces and includes a connecting element part (4) that has the nipple on one end and threads on another end thereof, and the threads are engageable with mating threads from a coupling element selected from a plurality of different coupling elements that are removably connectable to a mating coupling for the high pressure hose, the coupling element (5) having at least two parts and has a union nut (19) or a connecting screw (20) to connect to a matched coupling, said union nut connecting screw attaching to a back of an enlarged coupling end (21) of he coupling element (5).

\* \* \* \* \*